May 14, 1946. O. L. HERRON Re. 22,755

VENETIAN BLIND

Original Filed Nov. 20, 1943

INVENTOR.
Ollie L. Herron,
BY
Harness, Dickey & Pierce.
ATTORNEYS.

Reissued May 14, 1946

Re. 22,755

UNITED STATES PATENT OFFICE 22,755

VENETIAN BLIND

Ollie L. Herron, Chicago, Ill.

Original No. 2,379,353, dated June 26, 1945, Serial No. 511,066, November 20, 1943. Application for reissue September 12, 1945, Serial No. 615,900

8 Claims. (Cl. 160—178)

The invention relates to curtains or the like and it has particular relation to Venetian blinds.

The ordinary type of Venetian blind comprises a series of slats disposed between spaced pairs of fabric strips or ribbons and these strips have interconnecting tabs disposed under each slat. While blinds of this character have been and are widely used, a common and serious objection to them is that the fabric strips become soiled or discolored and as a result the blind presents an unsightly appearance. It is exceedingly difficult to clean the strips since they are fastened to the structure and it is impossible to remove them for dry or other similar cleaning. Usually an attempt to clean them while in place leaves telltale discoloration or marks and often the strips have a worse appearance than they had before cleaning.

One object of the present invention is to provide a Venetian blind having an improved type of ribbon and slat supporting structure which will avoid the objections previously noted with respect to the fabric strips.

Another object of the present invention is to provide a Venetian blind which is more easily maintained in a clean condition and which has an improved appearance as compared to structures heretofore used.

Other objects of the invention will become apparent from the following description, from the drawing to which it relates and from the claims hereinafter set forth.

For a better understanding of the invention reference may be had to the accompanying drawing wherein.

Figure 1:
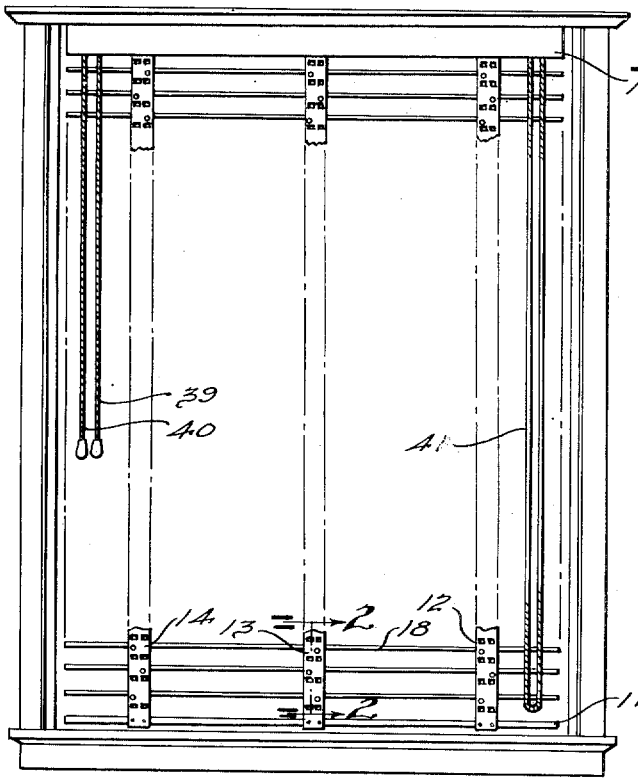
Figure 1 is an elevational view of a window having a Venetian blind constructed according to one form of the invention.
Figure 2:
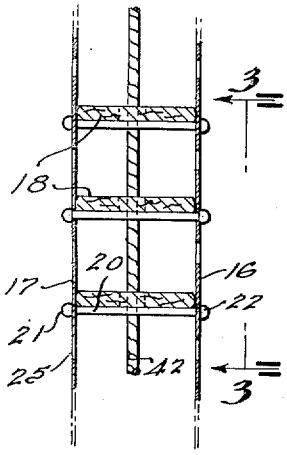
Figure 2 is a cross-sectional view on a larger scale taken substantially along the line 2—2 of Figure 1.

Referring to Figures 1 and 2, the Venetian blind illustrated may comprise an upper cross member or similar structure 10 and a lower cross member 11, constituting the upper and lower ends of the blind. In the design illustrated, three pairs of ribbons 12, 13 and 14 are connected to the cross members 10 and 11 and each of these pairs as seen in Figure 1 comprises ribbons 16 and 17. The ribbons are constructed from thin, flexible and preferably non-rusting metal, such as stainless steel, and the metal should be of such character as to be capable of repeated folding or collapsing in the manner shown by Figure 4, without breaking. Various types of stainless steel may be used as will be readily appreciated by those skilled in the art. The metal should be extremely thin, on the order of three or four thousandths of an inch, for instance, since a fairly flexible ribbon is desired and one which is not too heavy.

Figure 8:
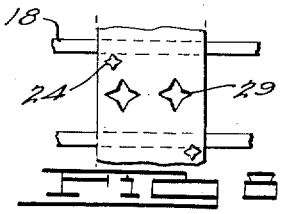
Figures 7 and 8 are forms of the invention illustrating modified types of supporting ribbons or strips for holding the slats.
Figure 7:
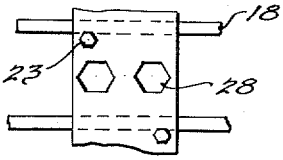

The slats are indicated at 18 and each slat is supported on each pair of ribbons by a connecting element 20 which in Figure 2 comprises a bar or rod having ball shaped ends 21 and 22. These elements extend through openings in the ribbons and the opening is slightly smaller than the ball shaped end so as to require some pressure in order to force the end through the opening. It should be readily understood that the opening may be of such size that the ball shaped end may be sprung through the opening by pressure and that once it is through the opening it will not be released during any ordinary use of the blind. Such openings may be circular or, as illustrated in Figures 7 and 8, at 23 and 24, the openings may be polygonal or star shaped. In each case the element 20 may be assembled with the ribbons by pressing the ball shaped ends through the openings.

Figure 4:
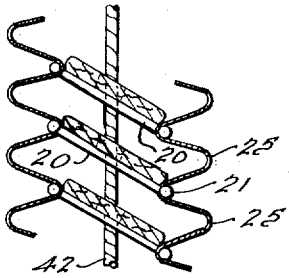
Figure 4 is a view similar to Figure 2, illustrating the blind in a partially folded or collapsed condition.

Additional openings 25 may be provided in the ribbons at points between the slats 18 so as to provide even greater flexibility at bending points, or in other words, to facilitate folding of the ribbons. In Figure 4 the blind is shown in a partly folded condition, and it will be observed that the openings 25 serve to initiate the bending of the ribbon at a point midway between the elements 20 and that the latter serve to define the folding points midway between the openings 25. While normally the ribbons will fold in the manner shown, it might be desirable in certain instances to laterally bow or curve the strip slightly with the concave side next to the slats so that greater resistance to folding towards the slats will be provided and hence folding will occur outwardly due to the slightly greater resistance. The bowing of the strip in this manner need only be very slight in order to accomplish this result.

Figure 3:
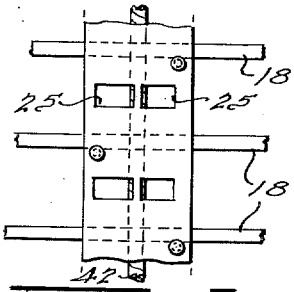
Figure 3 is a view taken substantially along the line 3—3 of Figure 2.

Instead of using rectangular openings 25 in Figure 3, the openings as indicated at 28 in Figure 7 may be hexagonal or of other polygonal form to correspond with the openings 23. This design may enhance the appearance of the structure. Similarly, as shown in Figure 8, the openings between the slats as indicated at 29 may be star shaped. Round openings also might be used in place of the openings 25 in Figure 3.

The elements 20 may be constructed of metal or other material of suitable character and it may be found preferable to use a plastic. Use of the latter material also is advantageous in that various colors may be readily obtained and hence the appearance of the blind may be varied or changed by using elements that have ball shaped ends of different colors. In connection with the metal ribbons, these normally may have a bright finish but a satin or other finish may also be obtained in stainless steel and either finish greatly improves the appearance of the blind, especially if the connecting elements and ribbons provide an attractive combination.

Figure 5:
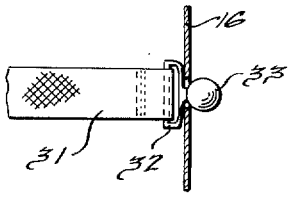
Figures 5 and 6 are views illustrating a modified form of slat supporting means constructed according to the invention.

Figure 5 shows another form of connecting element 31 to take the place of the elements 20 and in this form fabric strips are used which have eyes 32 at their ends with the latter provided with ball shaped elements 33.

Figure 6:
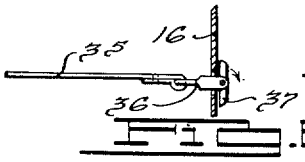

In the structure shown by Figure 6 fabric strips 35 are used for connecting the ribbons and these are connected to fastening devices 36 at their ends which have pivotal elements 37. The pivotal elements 37 may be swung into alignment with the opening in the ribbon so as to allow insertion or withdrawal of the fastening device through the opening in the ribbon and then the pivotal element 37 may be swung into the position shown. In some cases it may be found preferable to use this type of fastener.

The usual means of tilting the slats may be used in the blind although this is not shown excepting for the pull cords 39 and 40. The usual depending loop 41 is shown also and this is used for raising the lower cross element 11 by means of cords 42 extending downwardly through the slats as seen in Figure 2. Such cords are connected at their lower ends to the cross member 11 and when the loop 41 is pulled downwardly, the cords are raised. Ordinarily, the cords 42 will only be used between the two end pairs 12 and 14 of the metal ribbons.

Although more than one form of the invention has been illustrated and described in detail, it will be apparent to those skilled in the art that various modifications may be made without departing from the scope of the appended claims.

What is claimed is:

1. A Venetian blind comprising upper and lower cross supporting members, a series of slats arranged one above the other, a pair of thin, resiliently flexible vertically extending metal ribbons connected at their upper and lower ends to the cross members and extending downwardly at opposite sides of the slats, and means connecting the ribbons at each slat and extending under the slat to support the latter, said ribbons being foldable in accordion fashion as the lower cross member is elevated.

2. A Venetian blind comprising upper and lower cross supporting members, a series of slats arranged one above the other, a pair of thin, flexible vertically extending metal ribbons connected at their upper and lower ends to the cross members and extending downwardly at opposite sides of the slats, and means connecting the ribbons at each slat and extending under the slat to support the latter, said ribbons being foldable in accordion fashion as the lower cross member is elevated and having openings vertically intermediate the slat connecting means to facilitate the folding action.

3. A Venetian blind comprising upper and lower cross supporting members, a series of slats arranged one above the other, a pair of thin, resiliently flexible vertically extending metal ribbons connected at their upper and lower ends to the cross members and extending downwardly at opposite sides of the slats and having openings therethrough at the edges of the respective slats, and means connecting the ribbons at each slat and extending under the slat and comprising an element having knobs at its ends projectable through said openings by a snap action.

4. A Venetian blind comprising upper and lower cross supporting members, a series of slats arranged one above the other, a pair of thin, reresiliently flexible vertically extending metal ribbons connected at their upper and lower ends to the cross members and extending downwardly at opposite sides of the slats and having openings therethrough at the edges of the respective slats, and means connecting the ribbons at each slat and extending under the slat and comprising an element having balls at its ends projectable through said openings by a snap action.

5. A Venetian blind comprising upper and lower cross supporting members, a series of slats arranged one above the other, a pair of thin, flexible, vertically extending metal ribbons connected at their upper and lower ends to the cross members and extending downwardly at opposite sides of the slats, and means connecting the ribbons at each slat and extending under the slat to support the latter, said ribbons being foldable in accordion fashion as the lower cross member is elevated, and having weakened portions vertically intermediate the slat connecting means for reducing the resistance of the ribbons to bending.

6. A Venetian blind comprising an upper cross member, a series of slats, and a pair of resiliently flexible, thin steel ribbons disposed at opposite sides of and supporting the assembled slats and adapted to fold in accordion fashion, the slats being tiltable between the ribbons and also raisable vertically in a progressive manner beginning with the lowermost slat.

7. A Venetian blind comprising upper and lower cross supporting members, a series of slats arranged one above the other, a pair of resiliently flexible, vertically extending ribbons connected at their upper and lower ends to the cross members and extending downwardly at opposite sides of the slats and having openings therethrough at the edges of the respective slats, and means connecting the ribbons at each slat and extending under the slat and comprising an element having knobs at its ends projectable through said openings by a snap action.

8. A Venetian blind comprising upper and lower cross supporting members, a series of slats arranged one above the other, a pair of resiliently flexible, vertically extending ribbons connected at their upper and lower ends to the cross members and extending downwardly at opposite sides of the slats, an element extending under each slat and between the ribbons, and snap, releasable means connecting the ribbons to the ends of each element so that the elements may be readily attached to the ribbons and released therefrom.

OLLIE L. HERRON.